United States Patent
Tsai et al.

(10) Patent No.: US 9,528,581 B2
(45) Date of Patent: Dec. 27, 2016

(54) MOTOR DRIVEN LINEAR ACTUATOR AND ELECTRIC MOTOR THEREOF

(71) Applicant: DELTA ELECTRONICS, INC., Taoyuan Hsien (TW)

(72) Inventors: Ching-Hsiung Tsai, Taoyuan Hsien (TW); Chun-Chin Su, Taoyuan Hsien (TW); Chi-Wen Chung, Taoyuan Hsien (TW); En-Yi Chu, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 130 days.

(21) Appl. No.: 14/144,138

(22) Filed: Dec. 30, 2013

(65) Prior Publication Data

US 2015/0047444 A1 Feb. 19, 2015

Related U.S. Application Data

(60) Provisional application No. 61/866,759, filed on Aug. 16, 2013.

(51) Int. Cl.
| | |
|---|---|
| *F16H 3/06* | (2006.01) |
| *F16H 27/02* | (2006.01) |
| *F16H 29/02* | (2006.01) |
| *F16H 29/20* | (2006.01) |
| *F16H 25/20* | (2006.01) |

(52) U.S. Cl.
CPC ....... *F16H 25/20* (2013.01); *F16H 2025/2075* (2013.01); *Y10T 74/18576* (2015.01)

(58) Field of Classification Search
CPC .... F16H 25/00; F16H 2025/2075; H02K 7/06; H02K 7/003; F16D 1/00; F16D 1/027; F16D 1/10; F16D 1/104
See application file for complete search history.

(56) References Cited

U.S. PATENT DOCUMENTS

| | | | | |
|---|---|---|---|---|
| 2,957,368 A | * | 10/1960 | Hendrickson | 74/665 G |
| 3,559,496 A | * | 2/1971 | Betzing | 74/89.38 |
| 3,659,683 A | * | 5/1972 | Betzing | 188/162 |
| 4,270,063 A | * | 5/1981 | Dochterman | 310/66 |

(Continued)

FOREIGN PATENT DOCUMENTS

| | | |
|---|---|---|
| JP | H07-007885 | 1/1995 |
| JP | H09-057667 | 3/1997 |

*Primary Examiner* — William Kelleher
*Assistant Examiner* — Jake Cook
(74) *Attorney, Agent, or Firm* — Kirton McConkie; Evan R. Witt

(57) ABSTRACT

A motor driven linear actuator comprises an electric motor, a ballscrew device, and a rolling bearing. The electric motor includes a motor shaft having a first end portion. The first end portion includes an end surface and a receptacle having a first accommodation space. The ballscrew device includes a screw having a first end portion coaxially connected to the first end portion of the motor shaft. The first end portion of the screw includes a first section to be accommodated in the first accommodation space for fixing the screw with the motor shaft. The rolling bearing is disposed between the electric motor and the ballscrew device for supporting the first end portion of the screw. The end surface of the motor shaft contacts and abuts against the rolling bearing for limiting the movement of the rolling bearing between the electric motor and the ballscrew device.

14 Claims, 6 Drawing Sheets

(56) References Cited

U.S. PATENT DOCUMENTS

| | | | |
|---|---|---|---|
| 5,637,940 A * | 6/1997 | Nagai et al. | 310/80 |
| 6,191,548 B1 * | 2/2001 | Kajita et al. | 318/568.18 |
| 8,413,531 B2 * | 4/2013 | Horibe et al. | 74/89.32 |
| 2002/0184958 A1 * | 12/2002 | Meng | 74/89.34 |
| 2005/0011291 A1 * | 1/2005 | Nagai et al. | 74/89.32 |
| 2010/0133962 A1 * | 6/2010 | Hartmann et al. | 310/75 R |
| 2012/0146439 A1 * | 6/2012 | Gibas et al. | 310/83 |

* cited by examiner

MOTOR DRIVEN LINEAR ACTUATOR AND ELECTRIC MOTOR THEREOF

CROSS-REFERENCE TO RELATED APPLICATION

This application claims the benefit of U.S. Provisional Application No. 61/866,759 filed on Aug. 16, 2013, and entitled "MOTOR DRIVEN LINEAR ACTUATOR AND ELECTRIC MOTOR THEREOF", the entirety of which is hereby incorporated by reference.

FIELD OF THE INVENTION

The present invention relates to an actuator and an electric motor thereof, and more particularly to a motor driven linear actuator and an electric motor thereof.

BACKGROUND OF THE INVENTION

Motor driven linear actuators are well known in the art and used in a variety of applications, such as industrial machinery, precision machine tools, electronic machinery, transport machinery, and etc. The motor driven linear actuator conventionally converts the rotary motion of an electric motor to linear motion by using a ballscrew device.

FIG. 1 is a schematic longitudinal cross-sectional view showing a conventional motor driven linear actuator. The conventional motor driven linear actuator 1 includes an electric motor 11, a ballscrew device 12, a coupling 13, a frame 14, a bearing 15, and a fixing carriage-nut 16. The electric motor 11 includes a rotor 111, a stator 112, and a motor shaft 113. The motor shaft 113 is disposed in the rotor 111. The rotor 111 includes a plurality of permanent magnets 114 thereon, and the stator 112 includes windings which carry currents that interact with the magnetic field of the permanent magnets 114 of the rotor 111, so that a driving force is generated to turn the motor shaft 113 of the rotor 111. Preferably, the electric motor 11 is a servo motor.

The ballscrew device 12 is disposed in the frame 14 and includes a screw 121, a carriage-nut 122, a table 123, a linear bearing 124 and a supporting bearing 125. One end portion of the screw 121 of the ballscrew device 12 is coaxially connected to the motor shaft 113 of the electric motor 11 via the coupling 13. Namely, the coupling 13 is interconnected with the motor shaft 113 of the electric motor 11 and the screw 121 of the ballscrew device 12 for allowing the screw 121 of the ballscrew device 12 to be rotated according to the rotation motion of the motor shaft 113 of the electric motor 11. The carriage-nut 122 is threadably engaged with the screw 121, and the table 123 is fixed to the carriage-nut 122 for carrying a load thereon. The carriage-nut 122 incorporates rolling elements (not shown), such as balls, between the screw 121 and the carriage-nut 122. Consequently, a motor driven linear actuator with high load transfer and long life can be achieved. The linear bearing 124 is connected with the carriage-nut 122 and disposed in the frame 14 for holding the carriage-nut 122 in a non-rotatable state and guiding the carriage-nut 122 to move in a linear direction. Consequently, the carriage-nut 122 is moved along the screw 121 when the screw 121 of the ballscrew device 12 is rotated by the driving of the electric motor 11. The supporting bearing 125 is disposed in the frame 14 and configured to support the other end portion of the screw 121 of the ballscrew device 12, so that the end portion of the screw 121 is axially immovably relative to the frame 14.

When the motor shaft 113 of the electric motor 11 and the screw 121 of the ballscrew device 12 are coupled together via the coupling 13, a bearing 15 is employed to radially support the end portion of the screw 121, so that the rigidity of the electric motor 11 can be increased. In addition, a fixing carriage-nut 16 is fixed on the screw 121 and located between the coupling 13 and the bearing 15 for applying a pre-pressure on the bearing 15 and limiting the bearing 15 to move in an axial direction relative to the screw 121.

The conventional motor driven linear actuator 1 employs a coupling 13 to couple the motor shaft 113 of the electric motor 11 and the screw 121 of the ballscrew device 12 together. However, the rigidity of the coupling 13 is weak. Consequently, the rigidity of the motor driven linear actuator 1 is degraded, and the response speed of the motor driven linear actuator 1 can't be promoted. In addition, in order to secure the bearing 15, a fixing carriage-nut 16 must be fixed on the screw 121 and located between the coupling 13 and the bearing 15 for applying a pre-pressure on the bearing 15 and limiting the bearing 15 to move in an axial direction relative to the screw 121. Consequently, the coupling structure between the motor shaft 113 of the electric motor 11 and the screw 121 of the ballscrew device 12 is complex, the space for coupling the motor shaft 113 of the electric motor 11 and the screw 121 of the ballscrew device 12 is increased, and the whole length of the motor driven linear actuator 1 is increased.

Therefore, there is a need of providing a motor driven linear actuator and an electric motor thereof to obviate the drawbacks encountered from the prior arts.

SUMMARY OF THE INVENTION

The present invention provides a motor driven linear actuator and an electric motor thereof, in which the coupling between the motor shaft of the electric motor and the screw of the ballscrew device can be performed without using a coupling and a fixing carriage-nut.

The present invention provides a motor driven linear actuator and an electric motor thereof, in which a rigid coupling and concentric locating between the motor shaft of the electric motor and the screw of the ballscrew device can be achieved.

The present invention also provides a motor driven linear actuator with enhanced rigidity, faster response speed, smaller space for coupling the motor shaft of the electric motor and the screw of the ballscrew device, and increased axial and radial rigidity of the electric motor.

In accordance with an aspect of the present invention, a motor driven linear actuator is provided. The motor driven linear actuator comprises an electric motor, a ballscrew device, and a rolling bearing. The electric motor includes a motor shaft having a first end portion, and the first end portion includes an end surface and a receptacle having a first accommodation space. The ballscrew device includes a screw having a first end portion. The first end portion of the screw includes a first section. The first end portion of the screw is coaxially connected to the first end portion of the motor shaft. The first section of the screw is accommodated in the first accommodation space of the motor shaft for fixing the screw with the motor shaft. The rolling bearing is disposed between the electric motor and the ballscrew device and configured to rotatively support the first end portion of the screw. The end surface of the motor shaft contacts and abuts against the rolling bearing for limiting the movement of the rolling bearing between the electric motor and the ballscrew device so as to complete the assembly of rolling bearing.

In accordance with another aspect of the present invention, an electric motor for a motor driven linear actuator is provided. The motor driven linear actuator comprises a ballscrew device including a screw having a first end portion having a first section. The electric motor comprises a rotor, a stator, and a motor shaft. The motor shaft is disposed in the rotor and has a first end portion. The first end portion of the motor shaft is coaxially connected to the first end portion of the screw. The first end portion of the motor shaft includes an end surface and a receptacle having a first accommodation space for accommodating and fixing with the first section of the screw. The end surface of the motor shaft abuts against the rolling bearing.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2:
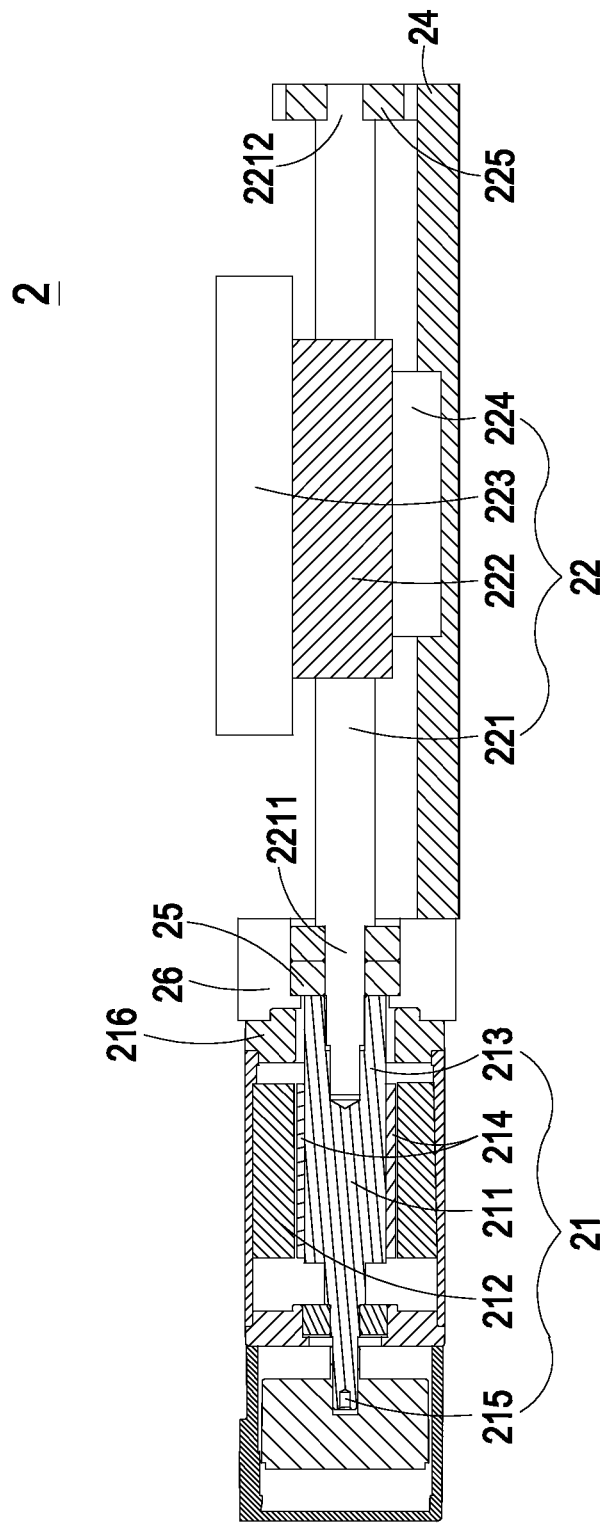
FIG. 2 is a schematic longitudinal cross-sectional view showing a motor driven linear actuator according to one preferred embodiment of the present invention.
Figure 3:
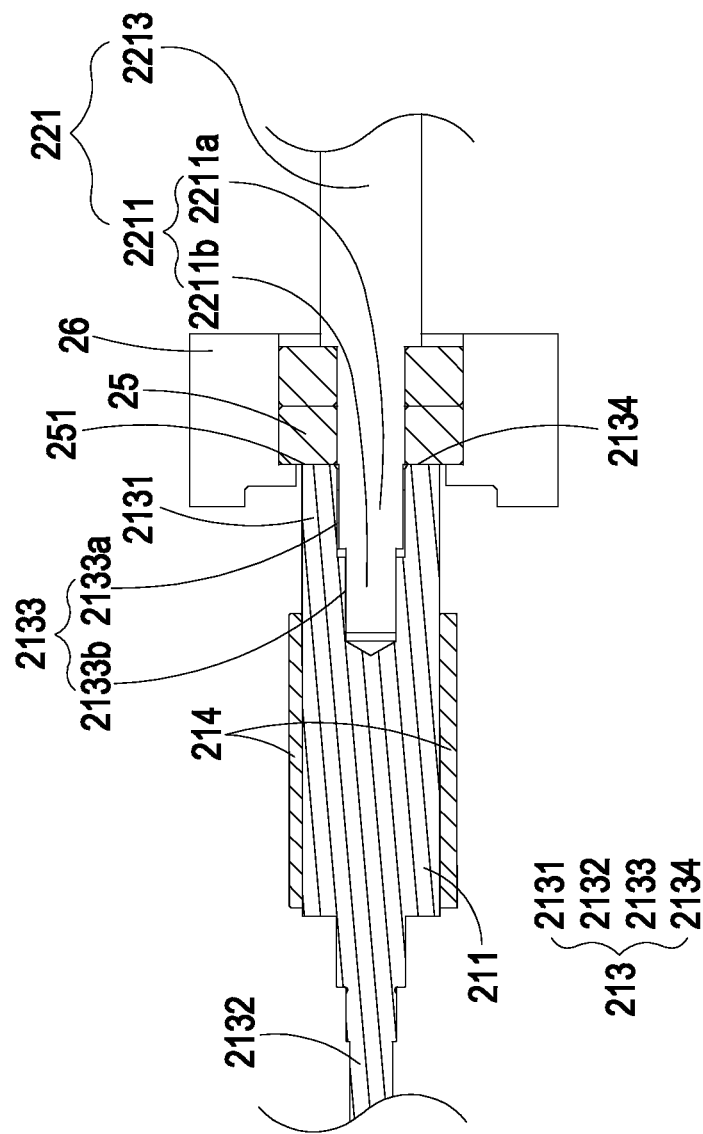
FIG. 3 is an enlarged partial view illustrating the coupling structure among the motor shaft of the electric motor, the rolling bearing and the screw of the ballscrew device of FIG. 2.

FIG. 2 is a schematic longitudinal cross-sectional view showing a motor driven linear actuator according to one preferred embodiment of the present invention; and FIG. 3 is an enlarged partial view illustrating the coupling structure among the motor shaft of the electric motor, the rolling bearing and the screw of the ballscrew device of FIG. 2. As shown in FIGS. 2 and 3, the motor driven linear actuator 2 includes an electric motor 21, a ballscrew device 22, a frame 24, and a rolling bearing 25. Preferably, the electric motor 21 is a servo motor, and the rolling bearing 25 is an angular ball bearing. In some embodiments, the rolling bearing 25 includes but not limited to a radial journal bearing, a deep groove ball bearing, a conical roller bearing and a cross roller bearing. The electric motor 21 includes a rotor 211, a stator 212, and a motor shaft 213. The motor shaft 213 is disposed in the rotor 211 and has a first end portion 2131 and a second end portion 2132. The first end portion 2131 of the motor shaft 213 includes a receptacle 2133 having a first accommodation space 2133a. The first accommodation space 2133a is coaxial with a rotation axle of the motor shaft 213. The first end portion 2131 of the motor shaft 213 further includes an end surface 2134. Preferably, the end surface 2134 is a flat end surface, and the end surface 2134 is perpendicular to the rotation axis of the motor shaft 213. The rotor 211 includes a plurality of permanent magnets 214, and the stator 212 includes windings (not shown) which carry currents that interact with the magnetic field of the permanent magnets 214 of the rotor 211, so that a driving force is generated to turn the motor shaft 213 of the rotor 211. In an embodiment, the electric motor further includes a position sensor 215, such as an encoder, disposed at the second end portion 2132 of the motor shaft 213 for sensing the rotation position of the rotor 211.

The ballscrew device 22 is disposed in the frame 24 and includes a screw 221, a carriage-nut 222, a table 223, a linear bearing 224 and a supporting bearing 225. Preferably, the supporting bearing 225 is a supporting rolling bearing. The screw 221 has a first end portion 2211 and a second end portion 2212. The first end portion 2211 of the screw 221 is coaxially connected to the first end portion 2131 of the motor shaft 213 of the electric motor 21. Namely, the motor shaft 213 of the electric motor 21 and the screw 221 of the ballscrew device 22 is connected and fixed with each other, so that the screw 221 of the ballscrew device 22 can be rotated synchronously according to the rotation motion of the motor shaft 213 of the electric motor 21. The carriage-nut 222 is threadably engaged with the screw 221, and the table 223 is fixed to the carriage-nut 222 for carrying a load thereon. The carriage-nut 222 incorporates rolling elements (not shown), such as balls, between the screw 221 and the carriage-nut 222. Consequently, the motor driven linear actuator 2 with high load transfer and long life can be achieved. The linear bearing 224 is connected with the carriage-nut 222 and disposed in the frame 24 for holding the carriage-nut 222 in a non-rotatable state (i.e. limiting the rotation of the carriage-nut 222) and guiding the carriage-nut 222 to move in a linear direction. Consequently, the carriage-nut 222 is moved along the screw 221 when the screw 221 of the ballscrew device 22 is rotated by the driving of the electric motor 21. The supporting bearing 225 is disposed in the frame 24 and configured to support the second end portion 2212 of the screw 221, so that the second end portion 2212 of the screw 221 is axially immovably relative to the frame 24. Thus, the radial rigidity of the screw 221 can be improved. In this embodiment, the first end portion 2211 of the screw 221 of the ballscrew device 22 includes a first section 2211a. The diameter length of the first section 2211a is smaller than that of the main portion 2213 of the screw 221. The first section 2211a is coaxial with a rotation axle of the screw 221. When the motor shaft of the electric motor 21 and screw 221 of the ballscrew 22 are coupled together, the first section 2211a of the screw 221 is accommodated in the first accommodation space 2133a of the motor shaft, so that the coupling between the motor shaft 213 of the electric motor 21 and the screw 221 of the ballscrew device 22 can be achieved.

In an embodiment, the main portion 2213 of the screw 221 has helical raceway grooves formed on the outer peripheral surfaces thereof for accommodating the rolling elements, and the threadably engagement between the screw 221 and the carriage-nut 222 is achieved.

In an embodiment, the receptacle 2133 of the motor shaft 213 further includes a second accommodation space 2133b in communication with the first accommodation space 2133a. The second accommodation space 2133b is coaxial with a rotation axle of the motor shaft 213. The first accommodation space 2133a is disposed between the end surface 2134 and the second accommodation space 2133b.

The diameter length of the first accommodation space 2133*a* is larger than that of the second accommodation space 2133*b*. In this embodiment, the first portion 2211 of the screw 221 of the ballscrew device 22 further includes a second section 2211*b* adjacent to the first section 2211*a*. The first section 2211*a* is arranged between the second section 2211*b* and the main portion 2213 of the screw 221. The diameter length of the first section 2211*a* is larger than that of the second section 2211*b*. The second section 2211*b* is coaxial with a rotation axle of the screw 221. The second section 2211*b* of the screw of the ballscrew device 22 is accommodated in the motor shaft 213 corresponding to the second accommodation space 2133*b*. Consequently, a concentric locating between the motor shaft 213 of the electric motor 21 and the screw 221 of the ballscrew device 22 can be achieved. Under this circumstance, the axial and radial rigidity between the motor shaft 213 of the electric motor 21 and the screw 221 of the ballscrew device 22 can be further improved. In an embodiment, an inner wall surface of the second accommodation space 2211*b* of the motor shaft 213 of the electric motor 21, a periphery surface of the second section 2211*b* of screw 221 of the ballscrew device 22 are smooth, and an appropriate tolerance is applied therein, so that high accuracy of the concentric locating can be achieved.

Figure 4A:
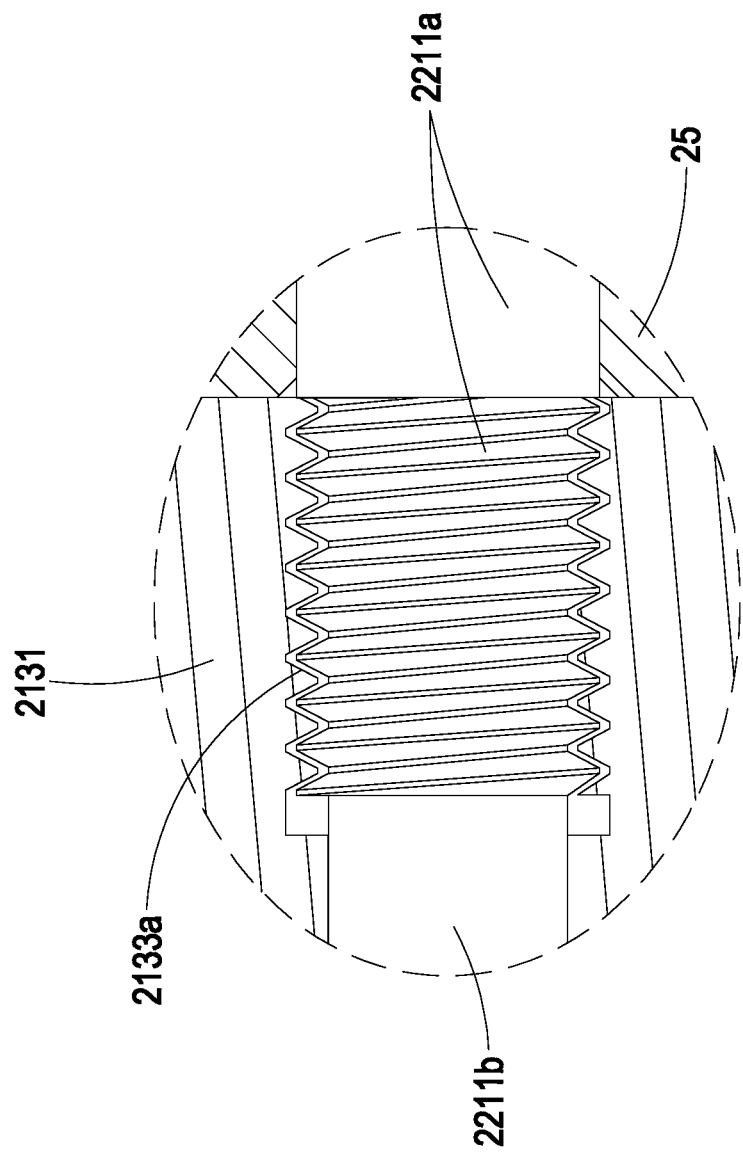
FIG. 4A to FIG. 4C are enlarged partial views illustrating various fixing mechanisms employed in the coupling structure between the motor shaft and the screw of FIG. 3.
Figure 4B:
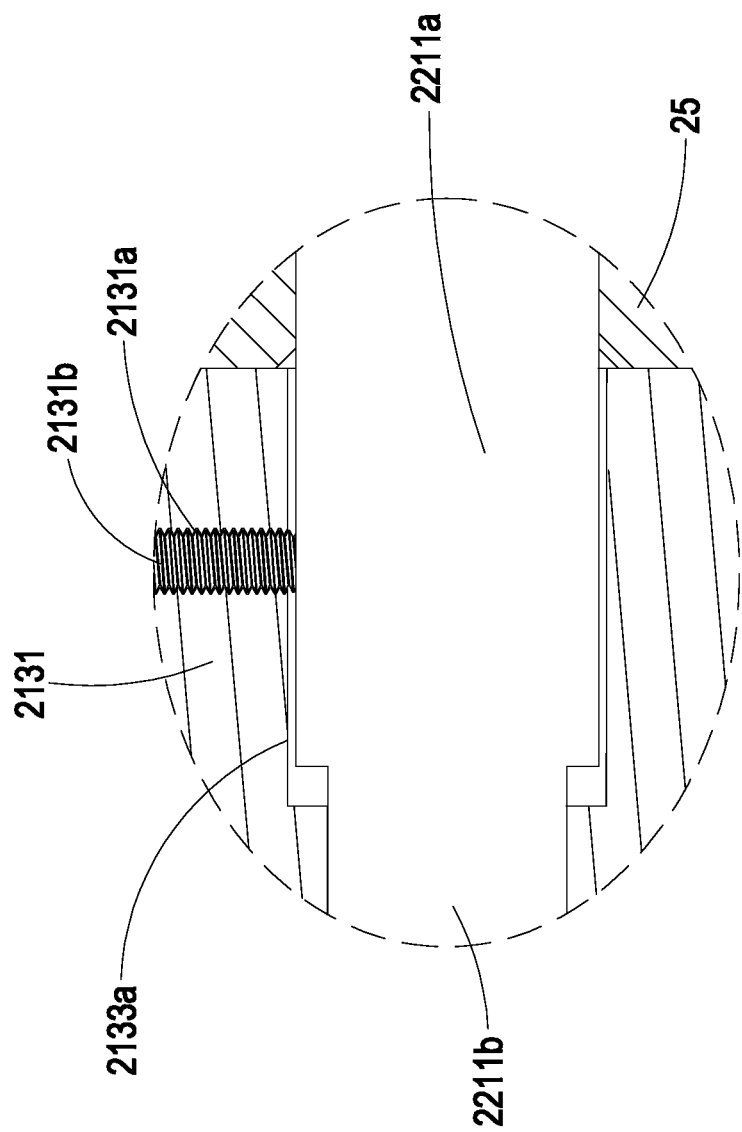
Figure 4C:
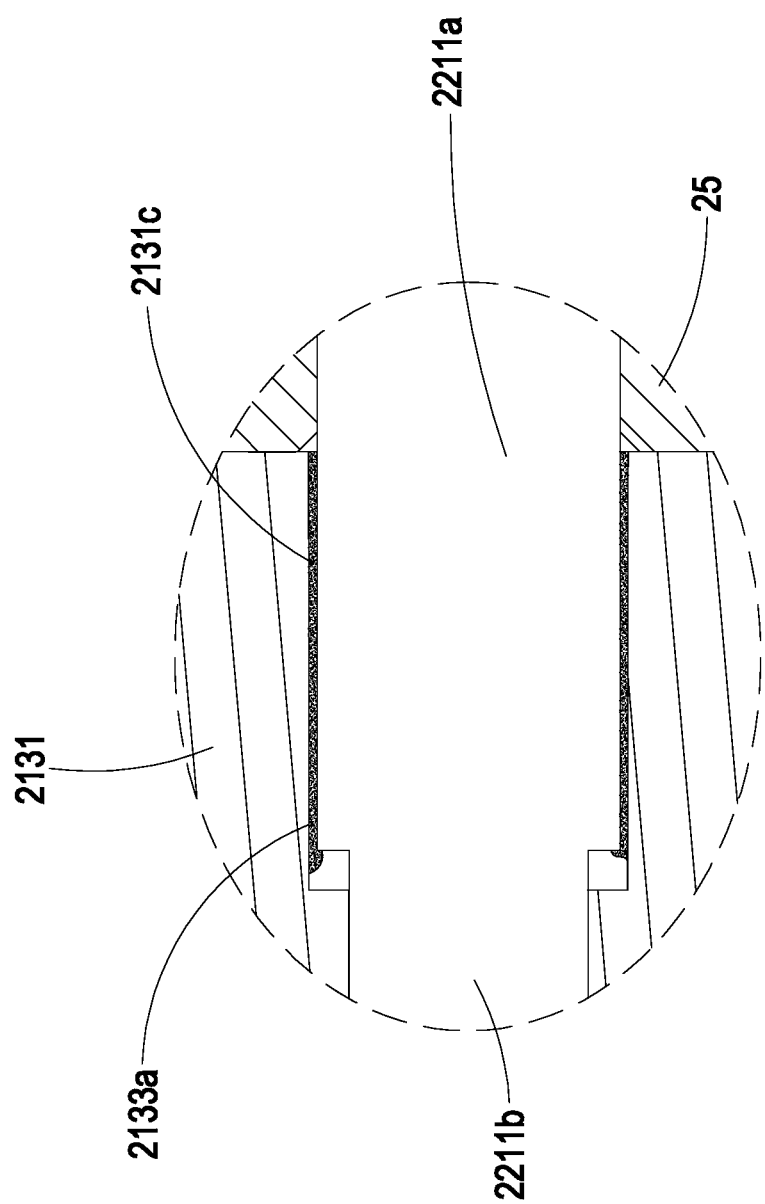

FIG. 4A to FIG. 4C are enlarged partial views illustrating various fixing mechanisms of the coupling structure between the motor shaft and the screw of FIG. 3. As shown in FIGS. 2, 3 and 4A to 4C, in an embodiment, the first accommodation space 2133*a* of the motor shaft 213 has screw thread on an inner wall surface thereof, and the first section 2211*a* of the screw 221 has screw thread on a portion of the outer periphery surface thereof. The screw thread of the inner wall surface of the first accommodation space 2133*a* are threadably engaged with the screw thread of the outer periphery surface of the first section 2211*a*, so that the first section 2211*a* of the screw 221 is accommodated in and rigidly coupled with the first accommodation space 2133*a* of the motor shaft 213. In another embodiment, the first end portion 2131 of the motor shaft 213 further includes a screw through hole 2131*a* and a screw 2131*b*. Preferably, the screw 2131*b* is a socket set screw. The screw 2131*b* is accommodated in the screw through hole 2131*a* and threadably engaged therewith. An end portion of screw 2131*b* contacts and abuts against the first section 2211*a* of the screw 221, so that the first section 2211*a* of the screw 221 is accommodated in and rigidly coupled with the first accommodation space 2133*a* of the motor shaft 213. In another embodiment, a fixing adhesive 2131*c* is disposed between the first accommodation space and the first section, so that the first section 2211*a* of the screw 221 is accommodated in and rigidly coupled with the first accommodation space 2133*a* of the motor shaft 213. Namely, the rigidly coupling between the first accommodation space 2133*a* of the motor shaft 213 and the first section 2211 of the screw 221 can be achieved by engagement of the screw threads (as shown in FIG. 4A), using the screw through hole 2131*a* and the screw 2131*b* (as shown in FIG. 4B), coating the fixing adhesive 2131*c* (as shown in FIG. 4C), or the combinations comprising at least two fixing mechanisms selected from the above three embodiments. Under this circumstance, the first section 2211*a* of the screw 221 is fixed to the first accommodation space 2133*a* of the motor shaft 213, and then the synchronous rotation among the electric motor 21 and the ballscrew device 22 can be performed without using a coupling. Consequently, the respond speed is increased.

Figure 1:
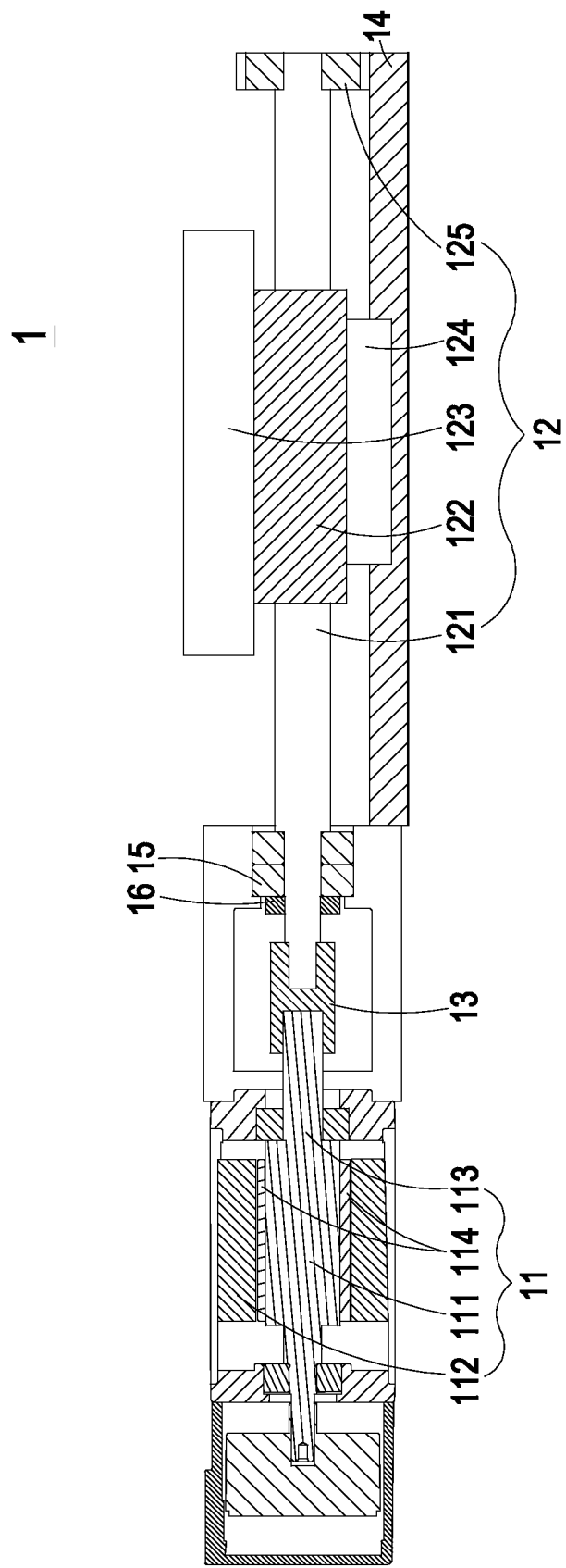
FIG. 1 is a schematic longitudinal cross-sectional view showing a conventional motor driven linear actuator.

The rolling bearing 25 is disposed between the electric motor 21 and the ballscrew device 22 and configured to rotatively support the first end portion 2211 of the screw 221. Consequently, the axial and radial rigidity of the electric motor 21 can be increased. In an embodiment, the rolling bearing 25 is an angular ball bearing, a deep groove ball bearing, a concial roller bearing, a cross roller bearing or a radial journal bearing, but it is not limited thereto. In this embodiment, the preferred amount of the rolling bearing 25 mounted between the motor shaft 213 of the electric motor 21 and the screw 221 of the ballscrew device 22 could be one or two. It is to be understood that the amount of the rolling bearing 25 is not limited, but can be various in accordance with the demands of the practical applications. The rolling bearing 25 has an inner ring 251 corresponding to the end surface 2134 of the motor shaft 213 of the electric motor 21. When the motor shaft 213 of the electric motor 21 and the screw 221 of the ballscrew 22 are coupled together, the end surface 2134 of the motor shaft 213 of the electric motor 21 can contact and abut against the inner ring 251 of the rolling bearing 25 directly. Under this circumstance, the end surface 2134 of the motor shaft 213 can be employed to secure the rolling bearing 25 and limiting the movement of the rolling bearing 25 relative to the screw 221. Namely, the end surface 2134 of the motor shaft 213 is configured to limit the movement of the rolling bearing 25 between the electric motor 21 and the ballscrew device 22. Consequently, a fixing carriage-nut 16 employed in a conventional motor driven linear actuator of FIG. 1 can be omitted.

In an embodiment, the motor driven linear actuator 2 further includes a supporting member 26 disposed between the electric motor 21 and the ballscrew device 22 and secured to a connection portion of the housing 216 of the electric motor 21 or secured to the frame 24. The supporting member 26 has a receiving space for holding the rolling bearing 25 and securing the rolling bearing 25 to the electric motor 21 or the frame 24.

From the above descriptions, the present invention provides a motor driven linear actuator and an electric motor thereof, in which the coupling between the motor shaft of the electric motor and the screw of the ballscrew device can be performed without using a coupling and a fixing carriage-nut. In addition, a rigid coupling and concentric locating between the motor shaft of the electric motor and the screw of the ballscrew device can be achieved by using the motor driven linear actuator. Moreover, the inventive motor driven linear actuator has enhanced rigidity, faster response speed, smaller space for coupling the motor shaft of the electric motor and the screw of the ballscrew device, and increased axial and radial rigidity of the electric motor.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A motor driven linear actuator, comprising:
   an electric motor including a rotor, a stator and a motor shaft having a first end portion and a second end portion, wherein the motor shaft is integrally formed with the rotor, the motor shaft is extended from the rotor in a horizontal direction, the rotor includes a plurality of permanent magnets, the first end portion of the motor shaft is exposed outside one side of the stator and the permanent magnets in the horizontal direction, the second end portion of the motor shaft is exposed outside the other side of the stator and the permanent magnets in the horizontal direction, and the first end portion of the motor shaft includes an end surface and a receptacle having a first accommodation space;

a ballscrew device including a screw having a first end portion, wherein the first end portion of the screw includes a first section, the first end portion of the screw is coaxially connected to the first end portion of the motor shaft, the first section of the screw is accommodated in the first accommodation space of the motor shaft, and the first end portion of the screw is completely accommodated in the receptacle of the first end portion of the motor shaft for fixing the screw with the motor shaft; and a rolling bearing disposed between the electric motor and the ballscrew device and configured to rotatively support the first end portion of the screw, wherein the end surface of the first end portion of the motor shaft contacts and abuts against the rolling bearing along the horizontal direction for limiting the movement of the rolling bearing between the electric motor and the ballscrew device.

2. The motor driven linear actuator according to claim 1, wherein the receptacle of the first end portion of the motor shaft further includes a second accommodation space, and the first end portion of the screw further includes a second section, wherein the second section of the screw is accommodated in the second accommodation space of the motor shaft for performing a concentric locating between the motor shaft and the screw.

3. The motor driven linear actuator according to claim 2, wherein a diameter length of the first accommodation space is larger than that of the second accommodation space, and a diameter length of the first section is larger than that of the second section.

4. The motor driven linear actuator according to claim 2, wherein the first accommodation space and the second accommodation space are coaxial with a rotation axle of the motor shaft, and the first section and the second section are coaxial with a rotation axle of the screw.

5. The motor driven linear actuator according to claim 1, wherein the electric motor is a servo motor.

6. The motor driven linear actuator according to claim 1, wherein the rolling bearing is an angular ball bearing, a deep groove ball bearing, a conical roller bearing, a cross roller bearing or a radial journal bearing.

7. The motor driven linear actuator according to claim 1, wherein the first accommodation space of the motor shaft has screw thread on an inner wall surface thereof, and the first section of the screw has screw thread on a portion of an outer periphery surface thereof, wherein the screw thread of the inner wall surface of the first accommodation space is threadably engaged with the screw thread of the outer periphery surface of the first section.

8. The motor driven linear actuator according to claim 1, wherein the first end portion of the motor shaft further comprises a screw and a screw through hole, wherein the screw is accommodated in and threadably engaged with the screw through hole, and an end portion of the screw abuts against the first section of the screw.

9. The motor driven linear actuator according to claim 1, wherein a fixing adhesive is disposed between the first accommodation space of the motor shaft and the first section of the screw.

10. The motor driven linear actuator according to claim 1, wherein the electric motor further includes a position sensor disposed at the second end portion of the motor shaft.

11. The motor driven linear actuator according to claim 1, further comprising a frame, and the ballscrew device is disposed in the frame.

12. The motor driven linear actuator according to claim 11, wherein the ballscrew device further includes:

a carriage-nut threadably engaged with the screw, wherein the carriage-nut incorporates a plurality of rolling elements between the screw and the carriage-nut;

a table fixed to the carriage-nut for carrying a load thereon;

a linear bearing disposed in the frame and connected with the carriage-nut for limiting a rotation of the carriage-nut and guiding the carriage-nut to move along the screw; and a supporting bearing disposed in the frame and configured to support a second end portion of the screw, wherein the carriage-nut is moved along the screw when the screw of the ballscrew device is rotated by the driving of the electric motor.

13. The motor driven linear actuator according to claim 1, further includes a supporting member disposed between the electric motor and the ballscrew device for holding and securing the rolling bearing.

14. An electric motor for a motor driven linear actuator, wherein the motor driven linear actuator comprises a ballscrew device and a rolling bearing, and the ballscrew device includes a screw having a first end portion having a first section, the electric motor comprising:

a rotor including a plurality of permanent magnets;

a stator; and a motor shaft integrally formed with the rotor and having a first end portion and a second end portion, wherein the motor shaft is extended from the rotor in a horizontal direction, the first end portion of the motor shaft is exposed outside one side of the stator and the permanent magnets in the horizontal direction, the second end portion of the motor shaft is exposed outside the other side of the stator and the permanent magnets in the horizontal direction, and the first end portion of the motor shaft is coaxially connected to the first end portion of the screw, wherein the first end portion of the motor shaft includes an end surface and a receptacle having a first accommodation space for accommodating and fixing with the first section of the screw, the first end portion of the screw is completely accommodated in the receptacle of the first end portion of the motor shaft, and the end surface of the first end portion of the motor shaft contacts and abuts against the rolling bearing along the horizontal direction for limiting the movement of the rolling bearing.

* * * * *